Oct. 28, 1941.    H. C. FIELD    2,260,894
DOME LIGHT ASSEMBLY
Filed Nov. 25, 1938    3 Sheets-Sheet 1
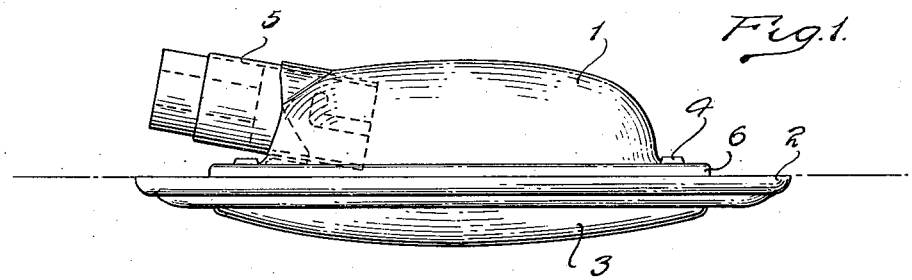
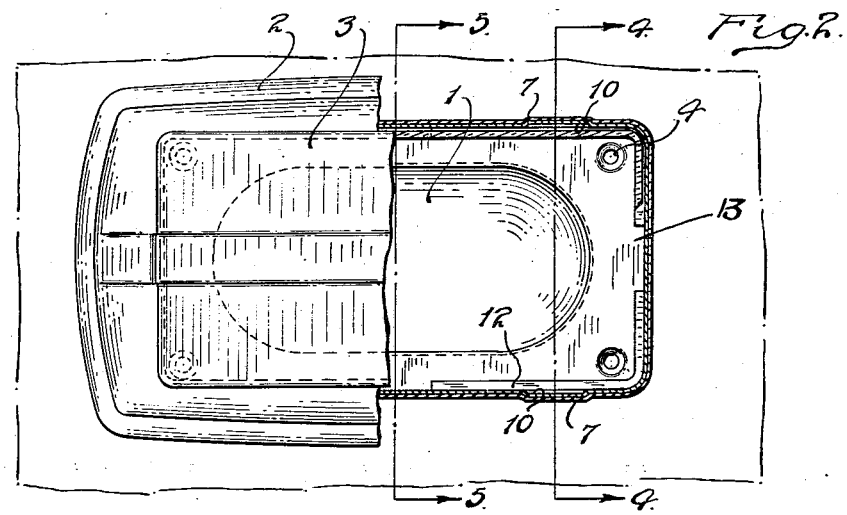
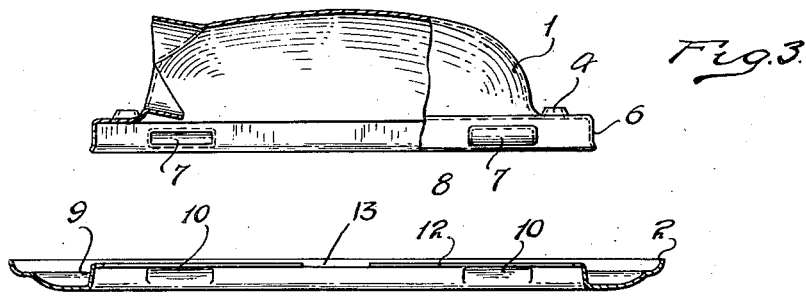
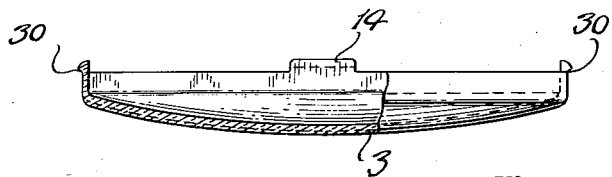
INVENTOR.
Herbert C. Field
BY Barnes, Kisselle, Laughlin & Raisch
ATTORNEYS.

Oct. 28, 1941.    H. C. FIELD    2,260,894
DOME LIGHT ASSEMBLY
Filed Nov. 25, 1938    3 Sheets-Sheet 2

INVENTOR.
Herbert C. Field
BY Barnes, Kisselle, Laughlin & Raisch
ATTORNEYS.

Oct. 28, 1941.  H. C. FIELD  2,260,894
DOME LIGHT ASSEMBLY
Filed Nov. 25, 1938  3 Sheets-Sheet 3

INVENTOR.
Herbert C. Field
BY Barnes, Kisselle, Laughlin & Raisch
ATTORNEYS.

Patented Oct. 28, 1941

2,260,894

UNITED STATES PATENT OFFICE 2,260,894

DOME LIGHT ASSEMBLY

Herbert C. Field, Detroit, Mich., assignor to Ternstedt Manufacturing Company, Detroit, Mich., a corporation of Michigan Application November 25, 1938, Serial No. 242,160

6 Claims. (Cl. 240—7.35)

This invention relates to a dome light assembly and particularly to a dome light for an automotive vehicle.

It is the object of this invention to produce a dome light assembly which is the acme of simplicity and therefore inexpensive to produce. This object has been accomplished by fabricating a dome light assembly in three parts, to wit; reflector, rim and lens, so that they can be readily secured together in and of themselves without the need of extraneous securing means.

In the drawings:

Fig. 1 is a side elevation of the dome light assembly.

Fig. 2 is a bottom plan view partly in horizontal section of the dome light assembly.

Fig. 3 is an exploded view of the dome light assembly showing the three parts before, and in the order of, assembly.

Figure 4:
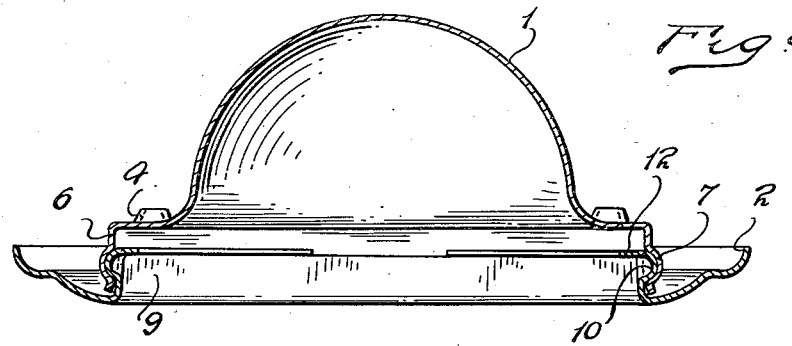
Figure 5:
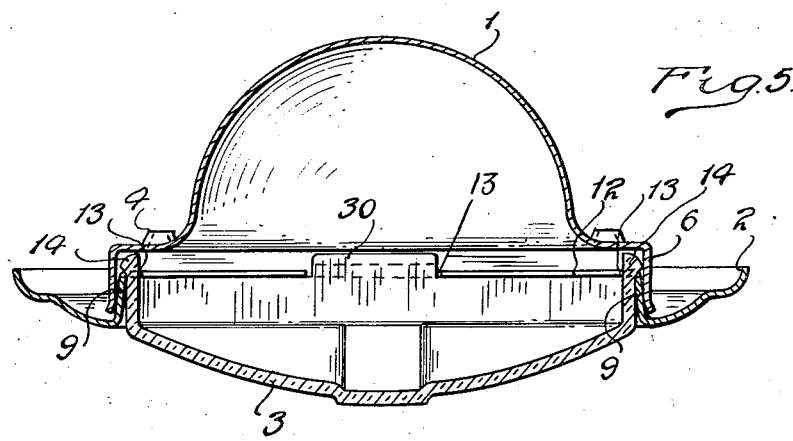

Figs. 4 and 5 are sections along the lines 4—4 and 5—5 of Fig. 2.

Figure 6:
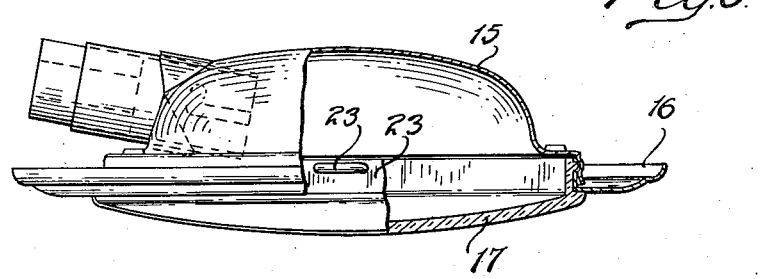

Fig. 6 is a side elevation partly in section of a modified form of dome light assembly.

Figure 7:
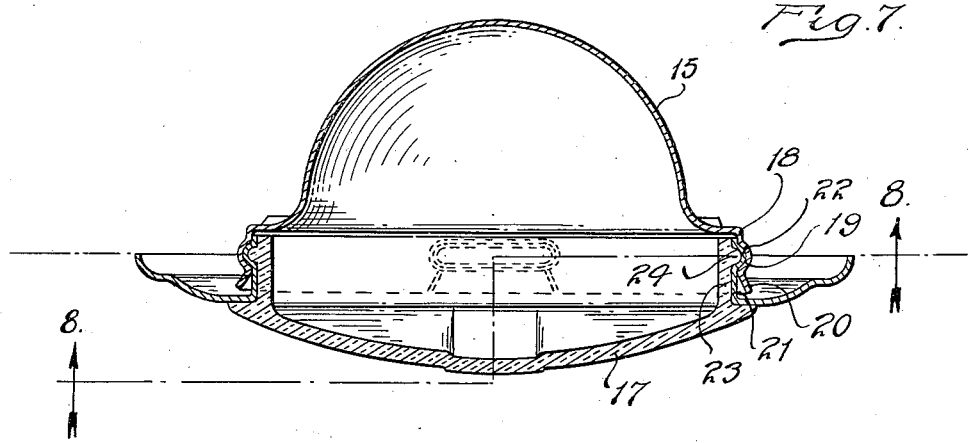

Fig. 7 is a vertical section through the modified form of dome light assembly.

Figure 8:
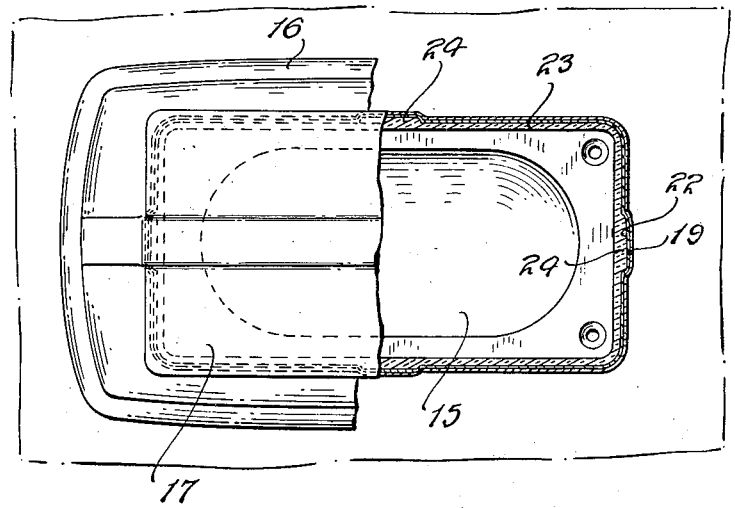

Fig. 8 is a section along the line 8—8 of Fig. 7.

Referring to the drawings, particularly Fig. 3, the dome light assembly comprises three parts, a reflector 1, a rim 2 and a lens 3. The reflector 1 is adapted for securement to any suitable support, such as the roof bows of the automobile body, by means of screws, for example, which are passed through the openings 4 in the reflector. The reflector also is provided with a socket 5 for an electric light bulb.

The reflector preferably takes the form of a concave sheet metal stamping provided with a circumferential flange 6. The flange 6 is provided with four identical socket members 7. Each socket member is in the form of an elongated concavity which is stamped in the flange 6 as shown particularly in Figs. 3 and 4.

The rim 2 takes the form of a metal stamping provided along its periphery with an upstanding flange 9 in the form of an inverted L. The flange 9 preferably is provided with a slight taper upwardly and inwardly as viewed in Fig. 5. The flange 9 is provided with four identical beads 10 each having an exterior configuration corresponding to the interior configuration of the sockets 7 of the reflector 1 with which they interengage in the completed assembly. Each bead 10 is stamped in the flange 9. The horizontal lip portion 12 of the inverted L flange 9 is provided with four notches 13.

The lens 3 is fabricated from any suitable transparent or translucent material, such as glass or thermoplastic material. The lens 3, as shown, is concave and provided with a flange 30 having four beads 14, portions of which overhang the outside periphery of the lens.

In assembly the lens 3 is inserted in the rim 2 so that the beads 14 pass through the notches 13 and snap over the flange 9 of the rim. The flange 9 yields sufficiently to permit the beads 14 to pass through the notches 13 and interengage the edge of the flange 9. Thus the beads 14 cooperate with the flange 9 to provide a snap-in interengagement between the lens and the rim. The rim and lens as thus assembled are next assembled to the reflector by passing the flange 9 of the rim inwardly of the reflector to interengage the beads 10 with the sockets 7. It should be noted that when assembled the sockets 7, beads 10 and beads 14 are very nearly coplanar and thus permit the assembly to occupy a minimum of space. Since the rim and reflector are metal stampings the flanges carrying sockets 7 and beads 10 yield sufficiently to permit the beads 10 to enter and snap into interengagement with the sockets 7 to hold the rim, lens and reflector together. Each of these bead connections is strengthened by the pressure exerted by the third part of the device. Thus there is a reinforcing effect secured by this arrangement.

If desired, the rim may be snapped first into interengagement with the reflector and the lens then snapped into the rim.

In the modified form shown in Figs. 6, 7 and 8, the assembly comprises a stamped concave metal reflector 15, a stamped metal rim 16 and a lens 17. The flange 18 of the reflector 15 is provided on each side with a socket 19. Each socket 19 takes the form of a depression or concave bead which is stamped in the flange 18 including an inclined lip 20. The rim 16 is provided with a flange 21 along its inner periphery which is provided with four concave beads 22 corresponding in shape to the sockets 19 and adapted for snap-in interengagement therewith. The lens 17 is provided with a circumferential flange 23 which is also provided with four spaced beads 24 adapted for interengagement with the sockets 22.

In this form of the invention the lens 17 preferably is assembled to the rim 16 by passing the flange 23 into the flange 21 whereupon the beads 24 snap into the sockets 22 formed in the flange 21 of the rim. The rim and lens thus assembled are then assembled to the reflector by passing the flange 21 of the rim into the flange 18 of the reflector. At this time the inclined lips 21 serve as registering devices and guides which cooperate with the socket portions 22 of the rim to guide them into interengagement with the socket portions 19 of the reflector 15. Here again the dome light may be assembled, if desired, by first snapping the rim into engagement with the reflector and then snapping the lens into the rim. Again too the reinforcing effect on the connecting means is secured in this modified form.

From the above it is evident that in both forms of the invention the lens is held assembled to the rim and the rim to the reflector by means integral with the respective members and having a snap-in interengagement.

I claim:

1. A dome light assembly comprising a stamped metal reflector, a stamped metal rim, and a lens, cooperating snap-in connecting means integral with the said rim and lens and interengaged to secure said lens in said rim, and cooperating snap-in connecting means integral with said rim and reflector and interengaged to secure said rim to said reflector, said snap-in connecting means reinforcing each other, both said snap-in connecting means being adapted to be actuating by linear movement.

2. A dome light assembly comprising a stamped metal reflector, a stamped metal rim, and a lens, one or more sockets formed in the reflector, one or more beads formed on the rim and interengaged with the sockets on the reflector to secure the rim to the reflector, and cooperating snap-in connecting means integral with the rim and lens and substantially coplanar with said interengaged beads and sockets for securing the lens within the rim, said bead and sockets and said snap-in connecting means reinforcing each other.

3. A dome light assembly comprising a stamped metal reflector having a flange, a stamped metal rim having a flange, a lens having a flange, one or more sockets stamped in the flange of the reflector, one or more beads stamped in the flange of the rim and interengaged with the sockets in the reflector to secure the rim and reflector together, and one or more beads formed on the flange of the lens and interengaged with the flange of the rim substantially coplanar with said interengaged sockets and beads to secure the lens in the rim, said bead connecting means reinforcing each other.

4. A dome light assembly comprising a stamped metal reflector having a flange, a stamped metal rim having a flange, a lens having a flange, one or more sockets stamped in the flange of the reflector, one or more beads stamped in the flange of the rim and interengaged with the sockets in the reflector to secure the rim and reflector together, and one or more beads formed on the outer edge of the flange of the said lens and overhanging the edge of the flange on the rim substantially coplanar with said interengaged sockets and beads to secure the lens in the rim.

5. A dome light assembly comprising a stamped metal reflector having a flange along its outer periphery, a stamped metal rim having a flange along its inner periphery, a plurality of socket members formed in the flange of the reflector, a plurality of beads formed in the flange of the rim and having a snap-in interengagement with the socket members on the reflector to secure the rim to the reflector, and a lens having a flange provided with a plurality of beads having a snap-over interengagement with the edge of the flange of the rim substantially coplanar with said interengaged beads and socket members to secure the lens in the rim.

6. A dome light assembly comprising a stamped metal reflector having a flange, a stamped metal rim having a flange, and a lens having a flange, the flanges of the rim being positioned within the flange of the reflector and the flange of the lens being positioned within the flange of the rim, one or more sockets formed in the flange of the reflector, one or more beads formed in the flange of the rim and interengaged with the sockets in the reflector to secure the rim to the reflector, and one or more beads formed on the flange of the lens and interengaged with the recesses forming the opposite surfaces of said beads of the rim to secure the reflector in the rim.

HERBERT C. FIELD.